(No Model.)
E. E. SWAN
PLOW WHEEL.
No. 273,779. Patented Mar. 13, 1883.
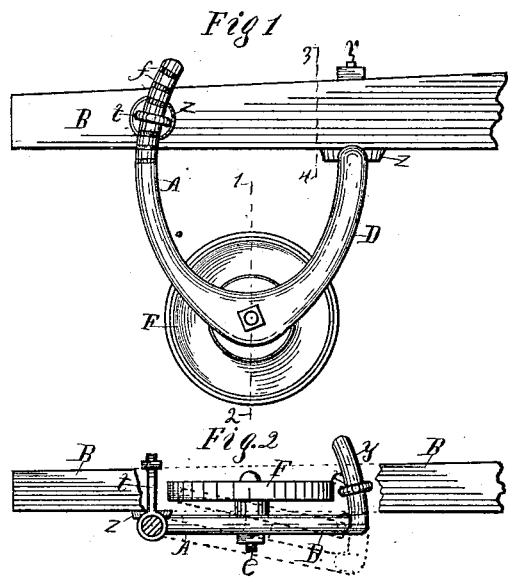
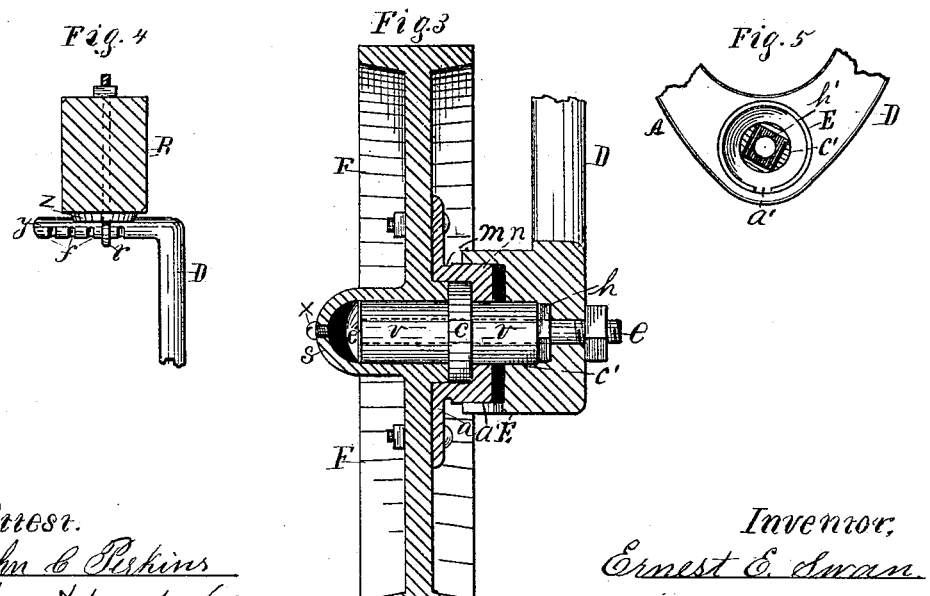
Attest.
John C. Perkins
John H. Askin
Inventor,
Ernest E. Swan
By Lucius C. West
Atty

UNITED STATES PATENT OFFICE.

ERNEST E. SWAN, OF TEXAS, MICHIGAN.

PLOW-WHEEL.

SPECIFICATION forming part of Letters Patent No. 273,779, dated March 13, 1883.

Application filed July 1, 1882. (No model.)

*To all whom it may concern:*

Be it known that I, ERNEST E. SWAN, a citizen of the United States, residing at Texas, county of Kalamazoo, State of Michigan, have invented a new and useful Plow-Wheel, of which the following is a specification.

My invention relates to the wheel of a plow and its standard for connecting it with the plow-beam.

It has for its object a construction whereby the bearings of the wheel are protected from sand and dirt and the wheel is proof against wabbling. Another object is to so construct the upper portion of the wheel-standard that it may be readily connected with any style of plow-beam in use in a manner that it can be adjusted both vertically and laterally, in accordance with the desired depth of plowing and the number of horses used, substantially in the manner explained in the detailed description.

In the drawings forming a part of this specification, Figure 1 is a side elevation of the device attached to a plow-beam; Fig. 2, top view with beam broken away; Fig. 3, section on line 1 2 in Fig. 1, showing the internal construction of the wheel and the form of the axle not in section; Fig. 4, section on line 3 4 in Fig. 1; and Fig. 5, lower end of the wheel-standard, showing the plan of the internal formation which receives the wheel-axle.

A D are the forward and rear arms of the wheel-standard, the same converging toward the lower end, where they are united.

$f$ is a curved serrated upward extension of arm A, and $y$ is a curved serrated lateral extension of arm D. These parts are held secured to beam B by bolts $t\ r$ in the manner shown in Figs. 1, 2, and 4. Said bolts are formed with eye ends, through which the extensions $f\ y$ are revolubly located, said eye ends being located in a serration of said extensions.

$z\ z$ are washers having recesses in which the extensions $f\ y$ are located. By loosening bolt $t$, owing to the curve of arm A and the revoluble capacity of extension $y$ under beam B, the standard and wheel may be swung up or down; and by loosening bolt $r$, owing to the curve of extension $y$ and the revoluble capacity of arm A on the side of beam B, the standard may be swung laterally, as in Fig. 2, setting the wheel at an oblique angle with the line of the floor-beam. This is done when using three horses, as the plow-beam is then drawn to one side, which still keeps the wheel on a line with the line of draft. It will be observed that the holes in which bolts $t\ r$ are located can be readily made in any plow-beam and the wheel-standard easily attached.

F is the wheel, provided with a pocket, $s$, at its center, which receives the front end of axle $r\ r$. Said axle has a center extension or circular flange, $c$, which fits against the open end of pocket $s$, preventing the wheel F from working farther onto the axle $r\ r$.

$n$ is a cap, the rim of which is bolted to wheel F, the crown being bored to receive the inner end of axle $r\ r$. This cap prevents the wheel from running off from the axle. A groove, $m$, is formed around the cap at the base of the rim, the use of which is hereinafter explained. The axle $r\ r$ has a center hole lengthwise through it, in which bolt $e$, having head $e'$, is located. The inner end, $h$, of the axle is formed angular or square and adapted to fit into recess $h'$ of the standard. The lower end of said standard, Fig. 5, has an extension, E, having a recess, in which cap $n$ is located, said recess having a rearward extension, $c'$, receiving the other end of the axle $r\ r$. The end of said recess $c'$ is formed square at $h'$ for the reason above stated, which prevents the axle $r\ r$ from turning. The axle $r\ r$ is firmly secured in place by tightening up the nut of bolt $e$, which tightening can in no way bind the wheel F.

$a'$ is a slot formed through extension E, as an outlet to any sand or dirt which might work its way in the larger recess of said extension past groove $m$, said groove being designed to prevent any sand working past it. By this arrangement it is impossible for any sand to get in the wheel-bearings.

The device may be lubricated by removing stopper $x$ and turning the plow on its side. Thus no dirt becomes mixed with the oil, and, owing to the peculiar construction, the oil is long retained.

Having thus described my invention, what I claim is—

1. The combination, with the standard, recessed as described, of the hollow axle having the circular flange and square end, the wheel having the pocket and the attached cap, and the fastening bolt and nut, all substantially as described.

2. The combination, with a plow-beam provided with the bolt-holes shown and the eyed bolts, of a wheel-standard having the upward round, curved, serrated extension and the lateral round, curved, serrated extension, all substantially as set forth.

ERNEST E. SWAN.

Witnesses:
JOHN H. ASKIN,
FRANCIS B. RANDALL.